United States Patent

[11] 3,634,773

[72] Inventor Hisashi Kobayashi
West Los Angeles, Calif.
[21] Appl. No. 889,093
[22] Filed Dec. 15, 1969
[45] Patented Jan. 11, 1972
[73] Assignee International Business Machines Corporation
Armonk, N.Y.

[54] CARRIER PHASE AND SAMPLING TIME RECOVERY IN MODULATION SYSTEMS
26 Claims, 5 Drawing Figs.

[52] U.S. Cl. .......... 329/50, 325/330, 328/133, 328/151, 329/106, 329/110
[51] Int. Cl. .......... H03d 3/18
[50] Field of Search .......... 329/50, 106, 110; 328/133, 134, 151, 117; 325/50, 330, 331; 178/5.4 SD; 333/18

[56] References Cited

UNITED STATES PATENTS

| | | | |
|---|---|---|---|
| 2,797,314 | 6/1967 | Eglin | 325/331 |
| 2,828,414 | 3/1958 | Rieke | 325/331 |
| 3,060,380 | 10/1962 | Howells et al. | 329/50 UX |
| 3,101,448 | 8/1963 | Costas | 329/50 |
| 3,320,552 | 5/1967 | Glasser | 329/50 X |
| 3,439,283 | 4/1969 | Danielson | 329/50 X |
| 3,440,548 | 4/1969 | Saltzberg | 328/151 |
| 3,500,217 | 3/1970 | Allen | 329/50 |

*Primary Examiner*—Alfred L. Brody
*Attorneys*—Hanifin and Jancin and John A. Jordan

ABSTRACT: Iterative and sequential techniques for carrier phase and sample time recovery are employed in the demodulator of PAM single sideband data transmission systems. The summation of the respective products of samples taken from an inphase and quadrature channel provide recursive estimates of the carrier phase for automatically converging the demodulator phase upon carrier phase. Likewise, the summation of the respective products of samples taken from the inphase and a differentiated inphase channel provide recursive estimates of sample time for automatically converging the demodulator sample time upon an optimum sample time.

INVENTOR
HISASHI KOBAYASHI

BY John A. Jordan
ATTORNEY

CARRIER PHASE AND SAMPLING TIME RECOVERY IN MODULATION SYSTEMS

BACKGROUND OF THE INVENTION

The present invention relates to a method and apparatus for the recovery of received data signals. More particularly, the present invention relates to a method and apparatus for recovering the sampling time and carrier phase of received data in digital data communications systems and the like.

Digital data signals, whether recovered from a communications channel or from some forms of storage medium or the like, are most often found to suffer from a variety of influences tending to make accurate recognition of signal quite difficult. These influences may generally be lumped into the two categories of noise and distortion.

Although for the most part noise may be overcome in communications channels and the like by modulation, filtering and encoding techniques, signal distortion due to the imperfect transfer characteristics of the channel presents a particularly difficult problem. Delay and attenuation of the carrier tends to subject the digital information signal to distortion which may, for example, be manifested in one particular form by an overlap in time between successive symbols. The latter is generally referred to as intersymbol interference.

Although various forms of equalizers have been developed to correct for channel characteristics intersymbol interference and distortion in general still present a problem in unambiguously detecting the digital information. This is especially so in linear modulation systems employing coherent detection as, for example, pulse amplitude modulation (PAM) systems using vestigal-sideband (VSB) signal transmission. Although such systems provide a particularly efficient mode of communicating digital data, it has been found difficult, in the face of the restrictions of channel characteristics effecting, for example, channel distortion and the like, to maintain the required accurate phase relationship between the signal generated by the local oscillator at the demodulator and the carrier signal.

Typically, such systems employ a phase-locked loop arrangement wherein the phase of the locally generated signal is compared and locked to the phase of a reference or pilot carrier inserted into the transmitted signal in quadrature with the modulated carrier. One of the difficulties of such an arrangement may be defined in terms of the undesired coupling between pilot carrier and data spectrum. Because of this coupling and because the bandwidth of the phase-locked loop cannot be made arbitrarily narrow, the phase swing of the pilot carrier caused by data components near the carrier frequency cannot be avoided. Additionally, because of channel distortion the quadrature relationship between the pilot carrier and modulated carrier cannot be maintained.

Another difficulty with the phase-locked loop arrangement lies in what may be referred to as phase intercept distortion. Thus, although phase shift may be practically linear over the data spectrum in the band-pass region of the channel, phase shift therebeyond is nonlinear resulting in the pilot carrier at the end of the data spectrum undergoing a distinctly different phase shift than the data components themselves.

It is known that the phase error at the demodulator due to the above-mentioned and other factors affects not only the detected signal amplitude but also the signal shape. The problem is compounded by the fact that utilization of an improper reference time at the demodulator for sampling creates a great amount of residual distortion. It is clear, however, that optimum sampling (i.e., sampling at the peak of the demodulated pulses) must be found in the face of the various forms of channel distortion which distortion itself further depends upon such parameters as carrier phasing which also must be optimized with respect to final residual distortion. Accordingly, effective correction for minimizing the probability of error due to intersymbol interference, noise and distortion in such systems requires, in addition to equalization, maintenance of an accurate sampling time and carrier phase relationship at the demodulator.

SUMMARY OF THE INVENTION

In accordance with the principles of the present invention carrier phase and reference sampling time are accurately obtained from the detected data sequence itself thereby obviating the difficulties incident the use of pilot carriers for phase and time recovery. Thus, by the present invention estimates of the optimum sampling time and carrier phase are obtained by taking an equalized sample of the demodulated signal from the inphase channel of the demodulator and unequalized samples of the demodulated signal from respective first and second alternate channels of the demodulator and separately multiplying and summing same. The respective summed signals are then fed back in separate loops to continuously control sampling time and oscillator phase whereupon a closer estimate is thus obtained and same continues so on in iterative and sequential fashion until each of the closed loops converges upon an optimum value for carrier phase and sample time.

Accordingly, it is an object of this invention to provide a new sample time correction circuit for sampling digital data.

It is a further object of this invention to provide a new phase correction circuit for carrier phase correction in data transmission systems.

It is yet a further object of this invention to provide an improved demodulator for data communications system.

It is still a further object of this invention to provide an improved demodulator for digital data communications system employing pulse-amplitude-modulation with linear modulation to passband.

It is yet still a further object of this invention to provide an improved demodulator for digital data communications system with novel sample time correction means for optimizing sampling time.

It is yet another object of this invention to provide an improved coherent demodulator for linear modulation systems with novel phase correction and recovery means.

It is yet still another object of this invention to provide an improved vestigal-sideband pulse amplitude demodulator system with recursive sample timing and phase correction circuits which act to repeatedly process the received signal to derive estimates of the unknown sample time and carrier phase parameters so that these parameters converge to their optimum values.

The foregoing and other objects, features and advantages of the invention will be apparent from the following more particular description of a preferred embodiment of the invention, as illustrated in the accompanying drawings.

DETAILED DESCRIPTION OF THE DRAWINGS

Figure 1:
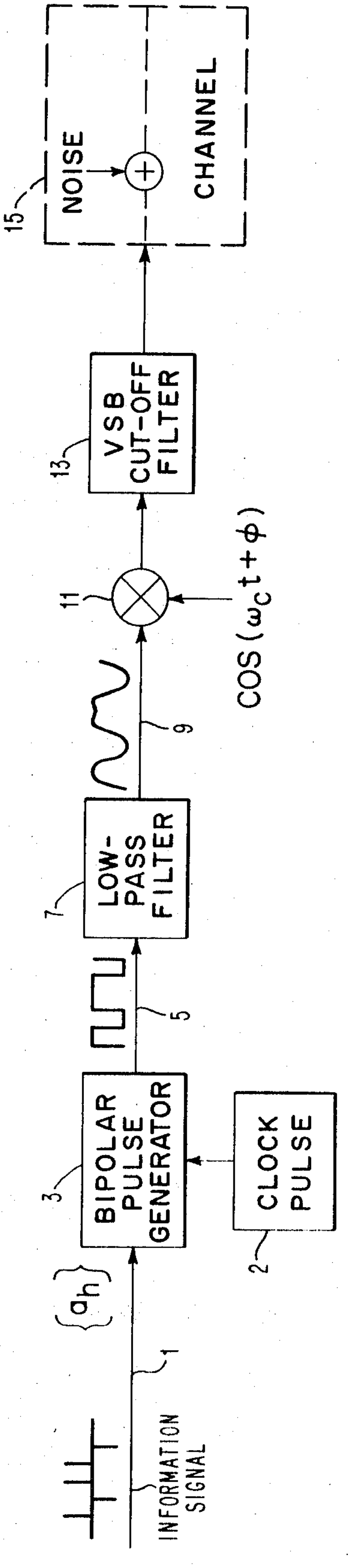
FIG. 1 shows a typical modulator arrangement which may be used to modulate digital data to be detected by the preferred embodiment of a demodulator employing the principles of the present invention.

The arrangement shown in FIG. 1 represents a typical VSB-PAM modulator system. Bipolar information pulses, depicted above input line 1, are received thereat to trigger pulse generator 3. Although binary level signals are shown, it is to be understood that multilevel forms of digital information signals may be used.

Pulse generator 3 provides a baseband signal comprising a series of bipolar pulses on its output line 5 in accordance with the polarity of the information pulses received at its input 1.

Low-pass filter 7 receives the rectangular bipolar pulses from pulse generator 3 and acts to remove the high-frequency components to provide the rounded pulse form shown on output line 9. Thus, the baseband signal bandwidth is reduced and the signal characteristics are made to more closely match the properties of the communication channel characteristics over which the signal is to be sent.

Since most communication channels may be regarded as passband rather than baseband, linear product modulator 11 acts to frequency shift or translate the baseband data signal from low-pass filter 7 to a more suitable frequency range in the passband region. After frequency translation by modulator 11, filter 13 provides a vestigal-sideband output signal for transmission over the communication channel, shown by broken line block 15. Introduction of noise is depicted within block 15.

Although filter 13 is shown as a VSB filter, it is to be understood that a single-side filter (SSB) may likewise be used, the latter being considered merely an extreme case of the former. Thus, VSB modulation as used herein includes SSB modulation. In regard to the $\cos(\omega_c t+\phi)$ function used in modulator 11 to translate the baseband signal, $\phi$ represents the carrier phase unknown to the demodulator at the receiving end and $\omega_c$ represents the carrier frequency.

Figure 2:
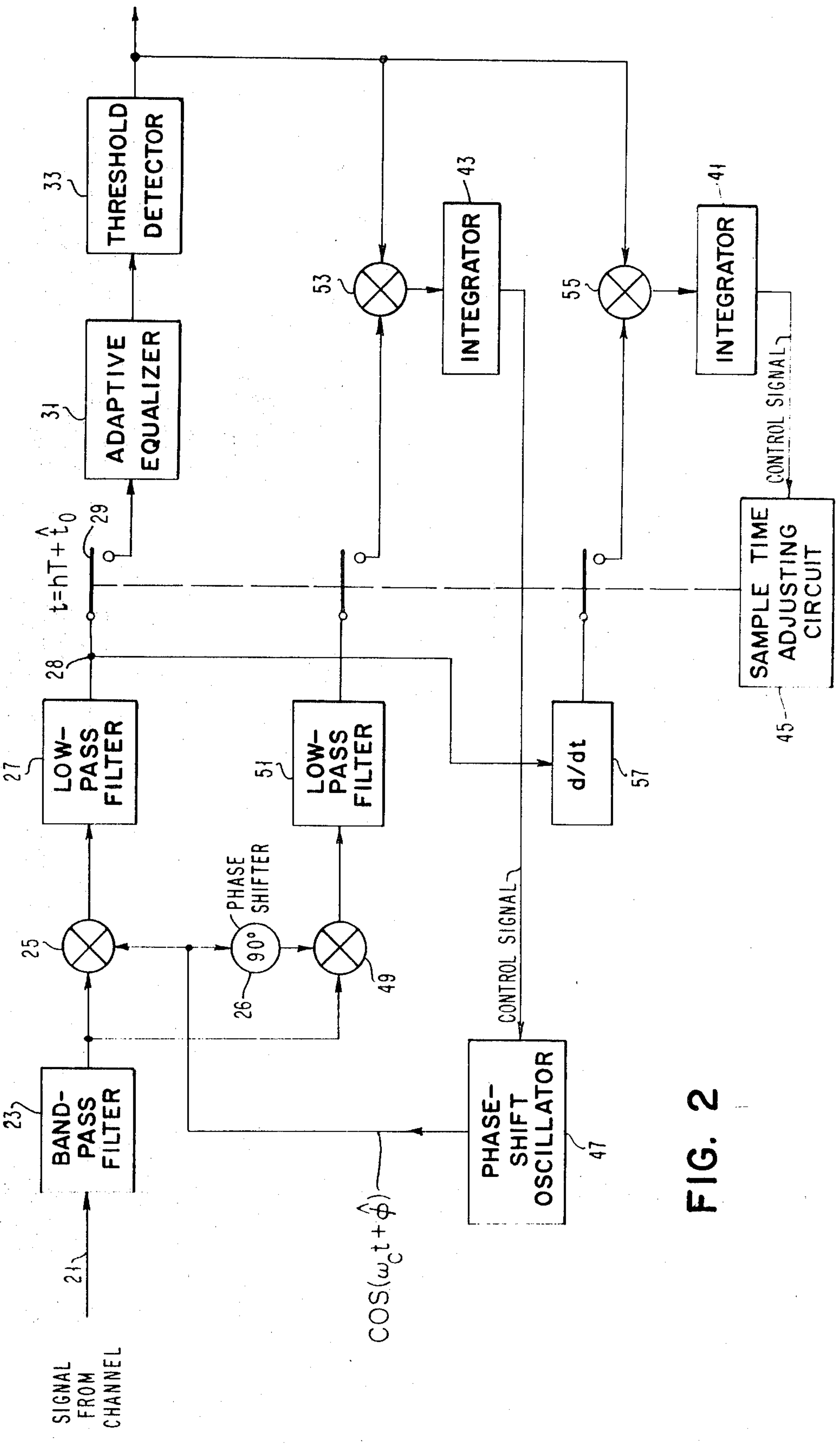
FIG. 2 shows a preferred embodiment of the demodulator employing the sample time and phase correction techniques in accordance with the principles of the present invention.

In the preferred form of the demodulator arrangement embodying the principles of the present invention, as shown in FIG. 2, the modulated signals from the communication channel are received at input line 21 and passed through band-pass filter 23. Band-pass filter 23, which may be any of a variety of conventional filters, is chosen to pass the modulated carrier and at the same time reduce noise. In addition the frequency characteristics of this filter are chosen to match those of the incoming signal and communication channel.

As shown in FIG. 2 product demodulator 25, of what hereinafter will be referred to as the inphase channel, demodulates the received signal back to baseband and passes the resulting PAM digital information type signals at baseband to low-pass filter 27. Low-pass filter 27, which may be any of a variety of well-known low-pass filters, is chosen to match the characteristics of the baseband signal shape so as to pass same and reduce noise.

The baseband output signal from filter 27 is sampled by sampling switch 29 which, it is clear, may be any of a variety of well known sampling switches. The sampled data is processed by adaptive equalizer 31 which may be any of a variety of well-known adaptive equalizers which provide a closed loop adaptation to changes in the transmission channel characteristics. It is to be understood, of course, that if the characteristics of the transmission channel are known and are time-invariant, then some form of fixed equalizer may be employed to compensate for transmission channel characteristics. For a more detailed discussion of equalization of baseband signals reference is made to "Principles of Data Communication," Lucky et al., McGraw-Hill, 1968. It should also be understood with respect to FIG. 2 that the functioning of switch 29 and equalizer 31 may be interchanged; i.e., the signal may be sampled after equalization rather than before, such that the equalizer 31 would be positioned between low-pass filter 27 and node 28.

The output of adaptive equalizer 31 is passed to threshold detector 33 where digital representations indicative of the information sent are provided. Threshold detector 33 may be any of a variety of well-known level detectors which act to detect the levels of the signals received. For binary data transmission this latter detector may, for example, amount to no more than a polarity detector. In other than a two-level digital system it is to be recognized that a threshold level slicer may, for example, be employed to provide an indication of the various levels of the received data.

The sample time and carrier phase correction and recovery circuits, according to the principles of the present invention, are shown in the lower portion of FIG. 2 wherein the outputs from integrators 41 and 43 continuously provide the respective estimated error signals to sample time adjusting circuit 45 and phase-shift oscillator circuit 47. The latter oscillator provides an output signal at carrier frequency $\omega_c$. In this respect it is noted that if the transmitter oscillator, as represented for example by the modulating oscillator signal shown at modulator 11 in FIG. 1, and the receiver oscillator, as shown by oscillator 47 in the demodulator of FIG. 2, are each made sufficiently stable, then the latter oscillator may independently generate the desired frequency $\omega_c$ at the receiver and any possible slight deviation in frequency between the transmitter and receiver oscillator may be corrected for by the phase adjustment arrangement provided in accordance with the principles of the present invention. Alternatively, the oscillator 47 frequency may be extracted from a carrier pilot or reference signal sent along with the modulated data in accordance with conventional techniques.

Figure 3:
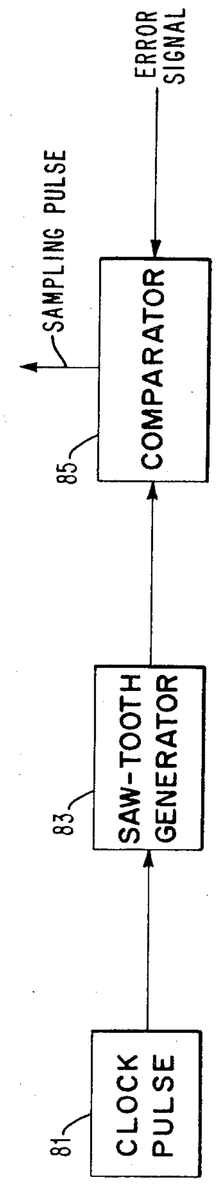
FIG. 3 shows one possible form of the sample time adjusting circuit employed in the embodiment of FIG. 2.

Likewise, the clock pulse generator 81, as shown in FIG. 3, which provides clocking pulses with a period T for the demodulator of FIG. 2, and the clock pulse generator 2 at the transmitter modulator in FIG. 1 may each also be made sufficiently stable so as to allow the former to generate pulses independently at the demodulator since small differences in the pulse repetition rate or frequency between the former and latter may be corrected for by the sample timing adjustment arrangement in accordance with the principles of the present invention. Alternatively, the clock pulse frequency or repetition rate for sampling may be derived from the data signal or from a pilot carrier sent along with the modulated data.

The principles of operation in accordance with the present invention, of the sampling time and carrier phase adjustment circuits in the lower portion of FIG. 2 will be more completely understood with reference to the following analysis. It is known that the phase error and sampling time error in a coherent demodulator of the form described affect not only the amplitude but the shape of the demodulated signal. Accordingly, the distorted demodulated output signal contains information as to phase and sampling time error. Such information may be continuously utilized in iteratively estimated form as feedback control information which regeneratively improves each successively sampled estimate in time to provide converging successive approximations as to optimum sampling time and carrier phase.

Let $\{a_h\}$ define the data sequence to the input of pulse generator 3 in FIG. 1 which modulates, i.e., initiates the signal pulse train $f(t)$ shown on line 5 therefrom. Let $h_r(t)$ represent the responses of VSB cutoff filter 13 in FIG. 1 and let $h_c(t)$ denote the channel response. In addition let $n(t)$ represent additive noise as shown within block 15 in FIG. 1 and let $\phi$ and $t_o$ represent, respectively, the true phase of the carrier at the demodulator and the true or optimum reference time for sampling at the demodulator. Then, the input signal to the synchronous demodulator of FIG. 2 may be represented by:

$$x(t)=s(t-t_o;\ \phi)+n(t)$$

where $$s(t;\ \phi)=\left[\left\{\sum_{n=-\infty}^{\infty} a_n f(t-nT)\right\}\cos\ (\omega_o t+\phi)\right]*h(t)$$

with $$h(t)=h_r(t)*h_c(t)$$

With the noise spectrum considered white it can be shown that the maximum likelihood estimates $\hat{t}_o$ and $\hat{\phi}$ of the respective optimum or true reference time, represented by $t_o$, and carrier phase, represented by $\phi$, are those which jointly maximize the following quantity:

$$L(\hat{\phi},\ \hat{t}_0)=\frac{1}{N}\sum_{h=m-N+1}^{m} \hat{a}_h(\hat{\phi},\ \hat{t}_0)\,y(hT;\ \hat{\phi},\ \hat{t}_0)$$

where $$y(hT;\ \hat{\phi},\ \hat{t}_0)\triangleq\int_{-\infty}^{\infty} x(t)[\{f(t-hT-\hat{t}_0)\cos\ (\omega_o t+\hat{\phi})\}*h(t)]dt$$

and where $\hat{a}_h$ represents the sampled estimate of the demodulated data sequence $a_h$. The first of these later expressions, that is, the integration of the convolution $\{f(t-hT-\hat{t}_o) \cos(\omega_c t+\hat{\phi})\} * h(t)$ times $x(t)$ expression can be generally shown to represent the inphase channel coherent demodulation function in FIG. 2 provided by band-pass filter 23 along with multiplier detection 25 using a demodulating $\cos(\omega_c t+\hat{\phi})$ and low-pass filter 27, the latter having an output which is sampled by sampling switch 29 at time $hT+\hat{t}_o$. The second of these latter expressions, that is, the $a_h$ expression is known to depend upon the $\hat{\phi}$ of this inphase coherent demodulation function. When the number of sum, $N$, is large and the input sequence and channel are quasi-stationary $L$ in the above-identified likelihood expression may be approximately represented by:

$$L(\hat{\phi}, \hat{t}_o) \cong P(\hat{\phi}, \hat{t}_o)\{\cos(\phi-\hat{\phi})r(t_o-\hat{t}_o)+\sin(\phi-\hat{\phi})q(t_o-\hat{t}_o)\}$$

where $$P(\hat{\phi}, \hat{t}_o)=E[a_h \cdot \hat{a}_h(\hat{\phi}, \hat{t}_o)],$$

$$r(t)=\frac{1}{4}\int_{-\infty}^{\infty}|F(\omega)|^2\{|H(\omega+\omega_o)|^2+|H(\omega+\omega_o)|^2\}e^{j\omega t}\frac{d\omega}{d\pi}$$

and $$q(t)=\frac{1}{4}j\int_{-\infty}^{\infty}|F(\omega)|^2\{|H(\omega+\omega_o)|^2-|H(\omega-\omega_o)|^2\}e^{j\omega t}\frac{d\omega}{d\pi}$$

In obtaining the above $r(t)$ expression $\{a_h\}$ was treated as an uncorrelated sequence. By letting $H(\omega)$ in the above $q(t)$ expression approximate a good low-pass filter with a cutoff frequency at $\omega_c$, as represented by VSB cutoff filter 13 in FIG. 1, then, it is clear that $q(t)$ is an odd function and $8(t)$ is the Hilbert transform of $r(t)$.

Since the above expression has but a single maximum in the region $|\hat{\phi}-\phi|<\pi/2$, $|\hat{t}_o-t_o|<T/2$, the expression may be maximized by using the gradient technique. Thus, the gradient of $l$, in the above expression, with respect to $\hat{t}_o$ is given by:

$$\frac{\partial L(\hat{\phi}, \hat{t}_o)}{\partial \hat{t}_o}=\frac{2}{N}\sum_{h=m-N+1}^{m}\hat{a}_h(\hat{\phi}, \hat{t}_o)\frac{\partial y(hT; \hat{\phi}, \hat{t}_o)}{\partial \hat{t}_o}$$

and the gradient of $L$ with respect to $\hat{\phi}$ is given by:

$$\frac{\partial L(\hat{\phi}, \hat{t}_o)}{\partial \hat{\phi}}=\frac{2}{N}\sum_{h=m-N+1}^{m}\hat{a}_h(\hat{\phi}, \hat{t}_o)\frac{\partial y(hT; \hat{\phi}, \hat{t}_o)}{\partial \hat{\phi}}$$

where $$\frac{\partial y(hT; \hat{\phi}, \hat{t}_o)}{\partial \hat{\phi}} = -\int_{-\infty}^{\infty}x(t)[\{f(t-hT-t_o)\sin(\omega_c t+\hat{\phi})\}*h(t)]$$

It can be seen from the finally derived expression for phase that the maximum likelihood estimate of the phase is given by the summation of the products of $\hat{a}_h(\hat{\phi})$, which is the sampled maximum likelihood estimate of the transmitted data sequence $\{a_h\}$, and the integration of the convolution $f(t-hT-t_o)\sin(\omega_c+\hat{\phi}) * h(t)$ times $x(t)$. With reference to FIG. 2 the $\hat{a}_h(\hat{\phi})$ function may readily be realized by the sampled output signal of the inphase channel obtained from adaptive equalizer 31 via detector 33. In a manner analogous to that described in regard to the in-phase channel of FIG. 2, it may be shown that the integration of the convolution $f(t-hT-t_o)\sin(\omega_c t+\hat{\phi}) * h(t)$ times $x(t)$ expression may be realized by the sampled value of the output signal from low-pass filter 51 of the quadrature channel where the input to the filter is derived from the output of multiplier detector 49, the latter in turn having received its modulated input from band-pass filter 23 and its demodulating $\sin(\omega_c+\hat{\phi})$ from phase shifter 26. Multiplier 53 provides the product of the signals represented by these two expressions while integrator 43 gives the summation or integrated values of the products. The output of integrator 43 accordingly provides an estimated error correction voltage to phase shift oscillator 47. This error correction voltage acts to adjust the phase of oscillator 47 which in turn causes the next estimate to be a closer estimate and the process continues so on in sequentially iterative steps until the oscillator converges upon the correct carrier phase.

Likewise, it can be seen from the finally derived expression for sample time that the maximum likelihood estimate for sample time is given by the summation of the products of $\hat{a}_h(\hat{t}_o)$ and the partial derivative of $y(hT; \hat{\phi}, \hat{t}_o)$ with respect to estimated time $\hat{t}_o$ where $y(hT; \hat{\phi}, \hat{t}_o)$ represents the time domain sampled value to the input of equalizer 31 in FIG. 2.

Thus, the above maximum likelihood estimate for sample time expression may be realized with the differentiation channel arrangement in FIG. 2. Accordingly, multiplier 55 receives both the sampled $\hat{a}_h(\hat{t}_o)$ output signal of the inphase channel obtained from equalizer 31 and the time domain sampled input to equalizer 31, as differentiated by differentiator 57. Multiplier 55 produces the product of these two inputs which product is in turn integrated by integrator 41. Thus, as in the case of the phase correction feedback control loop, the integrated value from integrator 41 provides an estimated error correction voltage to sample time adjusting circuit 45. This error correction voltage acts to adjust the sampling time which in turn causes the next estimate to be a closer estimate and the closed loop process likewise continues in sequentially iterative steps until the sample time adjusting circuit converges upon the reference time to provide optimum sampling.

It is clear that although the expressions derived above were derived in terms of both the time and phase parameters together, it is evident that expressions may likewise be derived for each of these parameters individually with the same results. In this respect it is to be understood that either of the feedback adjusting networks of FIG. 2 may be operated independently of the other so that a single one or the other may be employed in a demodulator or any other digital or like device wherein phase or time recovery is necessary or desirable. Thus, the sample time adjusting feedback control loop of FIG. 2 may, for example, be employed to optimumly sample digital data read from a magnetic recording device operated in the binary saturation recording mode. In such an arrangement the data read from the storage device would be in unmodulated form and therefore could be sent directly to equalizer 31 in FIG. 2. It is evident that such use would not require the phase adjusting feedback loop of FIG. 2.

With reference to FIG. 3 there is shown an arrangement exemplary of one possible type which may be employed for sample time adjustment. Clock pulse generator 81 generates pulses of period T corresponding to the period of the baseband information pulses. Saw-tooth generator 83 generates a ramp voltage in response to the clock pulses and when the voltage level of the ramp voltage compares to the level of the error signal an appropriate sample pulse is generated. Thus, the sample time is adjusted in accordance with the level of error voltage.

Figure 4:
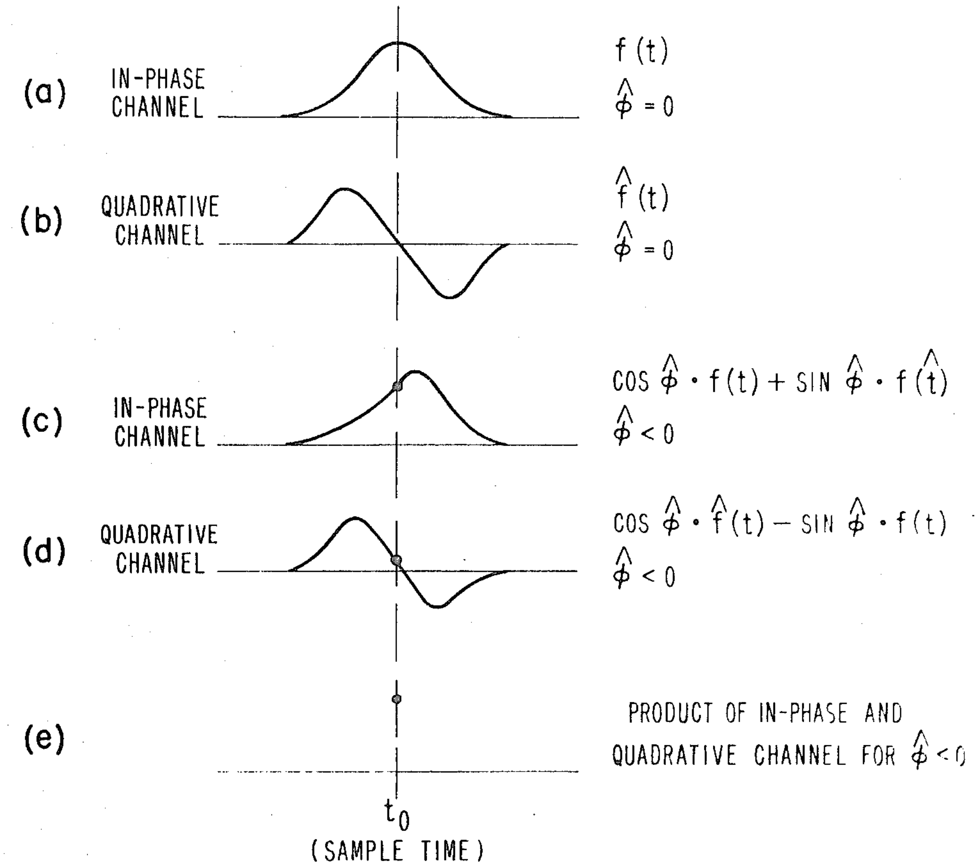
FIG. 4 shows a series of waveforms used in the description of phase correction.
Figure 5:
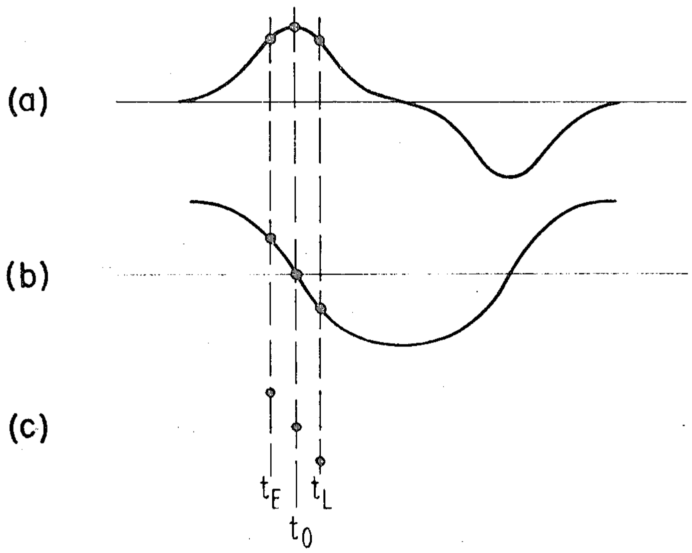
FIG. 5 shows a series of waveforms used in the description of sample time correction.

The manner in which carrier phase and sampling time correction operate in accordance with the arrangement of FIG. 2 will be more clearly understood by reference to the waveforms provided in FIGS. 4 and 5, respectively. For simplicity and clarity sake, the voltage waveforms of FIGS. 4 and 5 are shown in continuous and unsampled form, it being clear, of course, that the actual voltage as applied to multipliers 53 and 55 in accordance with the embodiment of FIG. 2 would be in sampled form. Accordingly, it should be understood that the voltage waveforms, of FIGS. 4 and 5 are merely depicted for purposes of explanation and no intent is made to illustrate actual voltage.

The signal received by the coherent demodulator of FIG. 2 may be expressed by:

$$s(t)=f(t)\cos\omega_c t-\hat{f}(t)\sin\omega_c(t)$$

where $\hat{f}(t)$ represents the Hilbert transform of $f(t)$ obtained by passing $f(t)$ through VSB filter 13 in FIG. 1. Then, it can be shown that the output from low-pass filter 27, the input of which is taken from product demodulator 25 of the inphase channel of the demodulator arrangement of FIG. 2, may be represented by:

$$s_p(t)=f(t)\cos\hat{\phi}+\hat{f}(t)\sin\hat{\phi}$$

Likewise, it can be shown that the output from low-pass filter 51, the input of which is taken from product demodulator 49 of the quadrature channel of FIG. 2, may be represented by:

$$s_q(t)=\hat{f}(t)\cos\hat{\phi}-\sin\hat{\phi}f(t)$$

With reference to the waveforms of FIG. 4, there is shown at (*a*) a representation of the $f(t)$ function when $\hat{\phi}=o$. Likewise, there is shown at (*b*) a representation of the $\hat{f}(t)$ function when $\hat{\phi}=o$. In FIG. 4 (*c*) there is shown a representation of the above defined $s_p(t)$ function, obtained from the inphase product demodulator 25 of FIG. 2, for $\hat{\phi}<o$. Likewise, FIG. 4(*d*) shows a representation of the above defined $s_q(t)$ function, obtained from the quadrature product demodulator 49, for $\hat{\phi}<o$. Thus, it can be seen from the waveforms of FIGS. 4(*a*) and 4(*b*) that when the phase error between oscillator 47 and the incoming carrier is zero the product of these two waveforms at sample time $t_o$, as provided by multiplier 53, in FIG. 2 is zero. However, when a phase error between oscillator 47 the incoming carrier does exist the $\hat{\phi}$ factor, in the above $S_p$ and $S_q$ expressions for the demodulated signal from the inphase and quadrature channels, skews the respective waveforms of FIGS. 4(*a*) and 4(*b*). Thus, as may be seen in FIGS. 4(*c*) and 4(*d*) when the phase error is negative the signals are skewed as shown and the product thereof, at sample time $t_o$, as shown in FIG. 4(*e*), is a positive voltage having a magnitude which is indicative of the magnitude of $\hat{\phi}$. It can be seen that if, conversely, $\hat{\phi}$ were positive then a negative output voltage having a magnitude which is indicative of the magnitude of $\hat{\phi}$ would likewise be obtained. Thus, a voltage which is a function of the estimate of phase error is produced which voltage as shown in FIG. 2 is fed back to control phase which in turn will allow a better estimate to be obtained and so on until oscillator 47 is inphase with the received carrier phase.

In FIG. 5(*a*) there is again shown a signal waveform from low-pass filter 27 of the inphase channel in FIG. 2. FIG. 5(*b*) represents the derivative of the waveform of FIG. 5(*a*) as differentiated by differentiator 57 in FIG. 2. FIG. 5(*c*) depicts the results of examples of early sampling at time $t_E$, late sampling at time $t_L$ and optimum sampling at time $t_o$.

Thus, sampling at the peak of the waveform of FIG. 5(*a*), which is the optimum sampling time $t_o$, corresponds to sampling at the zero level in the differentiated waveform of FIG. 5(*b*) and the product of these two sampled voltages, as provided by product multiplier 55 in FIG. 2, is zero. However, if sampling occurs early at time $t_E$ it can be seen that the product of the sampled voltage from the waveforms of FIGS. 5(*a*) and 5(*b*) is a positive voltage having a magnitude which is indicative of the magnitude of the error in sample time. Conversely, if sampling occurs late at time $t_L$ it can be seen that the product of the sampled voltages from the waveforms of FIGS. 5(*a*) and 5(*b*) is a negative voltage having a magnitude which is indicative of the magnitude of the error in sample time.

Although reference thus far has been generally in terms of binary information, it is clear that other forms of digital information may be employed in the arrangements described. In such instances threshold detector 33 in FIG. 2 would comprise an appropriate decision level device corresponding to the digital information levels used.

I claim:

1. A sampling system for sampling signal data including a sample time adjusting means for adjusting the time for sampling said signal data comprising:
   - system input means including demodulation means for demodulating a carrier signal containing said signal data and first sampling means for sampling said signal data in accordance with said sample time adjusting means;
   - equalizer means coupled to said sampling means for reducing effects of distortion on said signal data;
   - differentiator means coupled to said system input means for differentiating said signal data;
   - combining means having a first input circuit means coupled to the output of said equalizer means and having a second input circuit means coupled to the output of said differentiator means to thereby produce a control signal, said first input means including threshold detection means the output of which provides system output indications of said signal data and said second input circuit means including a second sampling means for sampling the differentiated signal data in accordance with said sampled time adjusting means; and
   - means coupling said control signal to said sample time adjusting means to control the sample time of said first and second sampling means.

2. The sampling circuit as set forth in claim 1 wherein said equalizer means includes an adaptive equalizer means.

3. A method of recovering the carrier phase of a linearly modulated signal comprising the steps of:
   - multiplying said linearly modulated signal by an inphase signal and removing high-frequency components from the product thereof to provide a first low-pass signal;
   - multiplying said linearly modulated signal by a quadrature signal and removing high-frequency components from the product thereof to provide a second low-pass signal;
   - sampling said first and second low-pass signals; and
   - combining the sampled values of said first low-pass signal with the sampled values of said second low-pass signal to thereby provide an output signal indicative of the phase difference between said carrier phase and the phase of said inphase signal, said output signal being effective for use in recovering the carrier phase of said linearly modulated signal.

4. The method as set forth in claim 3 comprising the further steps of:
   - differentiating said first low-pass signal and sampling the differentiated signal thereof; and
   - further combining the said sampled values of said low-pass signal with the sampled values of said differentiated signal to thereby provide an output signal indicative of the difference in time between the sampling time used and an optimum sampling time.

5. The method as set forth in claim 4 comprising the further step of equalizing the said sampled values of said first low-pass signal before combining with the respective said sampled values of said second low-pass signal and the said sampled values of said differentiated signal.

6. The method as set forth in claim 5 comprising the further steps of feeding back the said output signal indicative of the phase difference to adjust the phase of said inphase signal to that of said carrier phase and feeding back the said output signal indicative of the difference in time to adjust the sampling time used to that of said optimum sampling time.

7. The method as set forth in claim 6 wherein the step of combining and the step of further combining the said sampled values each involve combining the said sampled values to form a product.

8. A demodulation system including carrier phase recovery means for recovering the phase of a received modulated carrier comprising:
   - demodulation means including local oscillator means for producing a demodulating signal and first and second demodulator means coupled to receive said modulated carrier signal, said first demodulator means coupled to said local oscillator means for receiving said demodulating signal therefrom to provide an inphase demodulator channel means and said second demodulator means coupled to said local oscillator means for receiving said demodulating signal therefrom to provide a quadrature demodulator channel means;
   - sampling means coupled to said demodulation means for sampling the demodulated signals from each of said inphase demodulator channel means and said quadrature demodulator channel means;

means including combining means and first and second coupling means to said sampling means to combine the sampled signal from said inphase demodulator channel means with the sampled signal from said quadrature demodulator channel means to thereby provide an output signal indicative of the difference in phase between said modulated carrier signal and said demodulating signal from said local oscillator means; and feedback control circuit means coupling said output signal from said combining means to said local oscillator means to thereby adjust the phase of said oscillator means in accordance with the said output signal on said combining means whereby an iterative and sequential feedback control operation act to recover said carrier phase.

9. The system as set forth in claim 8 wherein said first coupling means includes equalizer means, said equalizer means providing an output to be used as both a demodulation system output and an output to be applied to said combining means.

10. The system as set forth in claim 9 further including;

differentiator means having input means and output means with the input means coupled to receive the demodulated signal from said inphase demodulator channel means;

further sampling means coupled to sample the output from said output means of said differentiator means;

sample time adjusting means coupled to both said sampling means and to said further sampling means to adjust the sampling time of each in accordance with the input signal applied to said sample time adjusting means;

further means including further combining means and further first and second coupling means coupling said combining means respectively to the said output means of said differentiator means and to the said output of said equalizer means to thereby provide an output signal indicative of the amount of error between the operating sampling time and the optimum sampling time; and further feedback control circuit means coupling the said output signal of said further combining means to the input of said sample time adjusting means to thereby adjust the sampling time of both said sampling means and said further sampling means in accordance with the said output signal on said further combining means whereby an iterative and sequential feedback control operation acts to provide optimum sampling time.

11. The system as set forth in claim 10 wherein said equalizer means are adaptive and wherein said first coupling means further includes threshold detection means coupled to the output of said equalizer means, said threshold detection means providing an output to be used as both a demodulation system output and an output to be applied to both said combining means and said further combining means.

12. The system as set forth in claim 11 wherein said feedback control circuit means and said further feedback control circuit means each include integration means.

13. The system as set forth in claim 12 wherein said inphase demodulator channel means and said quadrature demodulator channel means each include low-pass filter means coupled to provide demodulated signals to said sampling means.

14. In a data communications system a coherent demodulator circuit for demodulating the vestigal sideband of a linearly modulated carrier signal used to frequency translate a PAM baseband signal to passband, said demodulator circuit including both oscillator means producing a demodulating signal and coupled to provide an inphase demodulator channel and a quadrature demodulator channel and carrier phase recovery means coupled to the outputs thereof, said carrier phase recovery means comprising:

sampling means coupled to sample the signal output from both said inphase demodulator channel and from said quadrature demodulator channel;

threshold detection means having an input and an output with said input coupled to said sampling means to receive the sampled signal output from said inphase demodulator channel; and combining means coupled to combine said output from said threshold detection means with the sampled signal output from said quadrature demodulator channel to produce a control voltage indicative of the difference between the phase of said carrier signal and the phase of the said demodulating signal of said oscillator means.

15. The demodulator circuit as set forth in claim 14 further including sample time recovery means, said sample time recovery means comprising:

differentiation means coupled to said inphase demodulator channel to provide a differentiated output; and further combining means coupled to combine the said differentiated output from said differentiation means with the said output from said threshold detection means to produce a further control voltage indicative of the difference between the sampling time of said sampling means and an optimum sampling time.

16. The demodulator circuit as set forth in claim 15 wherein said control voltage and said further control voltage are each fed back to respectively adjust the phase of said demodulating signal to carrier phase and the sampling time of said sampling means to optimum sampling time.

17. A demodulation system including carrier phase recovery means for recovering the phase of a received modulated carrier signal comprising:

demodulation means including phase-adjustable local oscillator means and first and second demodulator means coupled to receive said modulated carrier, said first and second demodulator means coupled to said local oscillator means so as to form an inphase demodulator channel and a quadrature demodulator channel;

equalizer means having an input and an output with the input coupled to receive the demodulated output signal from said inphase demodulator channel;

first sampling means coupled to sample the said output from said equalizer means and second sampling means coupled to sample the demodulated output from said quadrature demodulator channel;

means including combining means coupled to said first and second sampling means to combine the sampled output from said equalizer means with the sampled output from said quadrature channel to provide an output signal indicative of estimates of the amount of phase error between said received carrier signal and said local oscillator means; and feedback control circuit means coupled to said combining means and to said local oscillator means to adjust the phase of said local oscillator means in accordance with the said output signal indicative of estimates of the amount of phase error from said combining means.

18. The system as set forth in claim 17 wherein threshold detection means coupled between said first sampling means and said combining means to provide a detected sample of the said output of said equalizer means for said combining means.

19. The system as set forth in claim 18 wherein the said means including also includes integration means coupling said combining means to said feedback control circuit means.

20. The system as set forth in claim 19 further including:

differentiator means having an input and an output with said input coupled to the said output of said equalizer means;

third sampling means coupled to sample the said output of said differentiator means;

sample time adjusting means coupled to said first, second and third sampling means to adjust the sampling time thereof;

further means including further combining means coupled to combine the said output from said differentiator means with the said detected sample from said threshold detection means to provide an output signal indicative of an estimate of the amount of sampling time error between the operating sampling time and optimum sampling time; and further feedback control circuit means coupled to said further combining means and to said sample time adjusting means to adjust the sample time in accordance with the said output signal indicative of an estimate of the amount of sampling time error from said further combining means.

21. The system as set forth in claim 20 wherein the said further means including also includes integration means coupling said further combining means to said further feedback control circuit means.

22. The system as set forth in claim 21 wherein said combining means and said further combining means each include multiplication means.

23. A demodulation system including oscillator means coupled to form an inphase demodulator channel and a quadrature demodulator channel and further including carrier phase and sample time recovery means for recovering carrier phase and sample time from a received modulated signal, said carrier phase and sample time recovery means comprising:

differentiation means coupled to said inphase demodulator channel to provide a differentiated demodulated signal therefrom;

sampling means coupled to said inphase demodulator channel, said quadrature demodulator channel and said differentiation means to provide respective sampled signals therefrom;

sample time adjustment means coupled to said sampling means to adjust the sample time of said sampling means;

equalizer means having an input and an output with said input coupled to receive the said sampled signals from said inphase demodulator channel;

combining means coupled to combine the said output from said equalizer means respectively with the said sampled signals from said quadrature demodulator channel to produce a first error signal indicative of the difference inphase between said received carrier signal and said oscillator means and with said sampled signals from said differentiation means to produce a second error signal indicative of the difference between the operating sample time and optimum sampling time;

first feedback control circuit means coupling said first error signal to said oscillator means to adjust the phase of said oscillator means in accordance with said first error signal; and second feedback control circuit means coupling said second error signal to said sample time adjustment means to adjust the sample time of said sampling means in accordance with said second error signal.

24. The system as set forth in claim 23 wherein said first and second feedback control circuit means each include integration means.

25. The system as set forth in claim 24 wherein said received modulated signal comprises a vestigal sideband of a carrier used to modulate a pulse amplitude modulation signal from baseband to passband.

26. The system as set forth in claim 25 wherein said inphase demodulator channel and said quadrature demodulator channel each include low-pass filter means.

* * * * *